(No Model.) 3 Sheets—Sheet 1.

C. L. PAGENHART.
ROTARY ENGINE.

No. 268,722. Patented Dec. 5, 1882.

Attest:
F. H. Schott
A. R. Brown.

Inventor:
Charles L. Pagenhart
by J. C. Taskevatty

N. PETERS, Photo-Lithographer, Washington, D. C.

(No Model.) 3 Sheets—Sheet 2.

C. L. PAGENHART.
ROTARY ENGINE.

No. 268,722. Patented Dec. 5, 1882.

Attest:
F. H. Schott
A. R. Brown

Inventor:
Charles L. Pagenhart (No Model.) 3 Sheets—Sheet 3.
C. L. PAGENHART.
ROTARY ENGINE.
No. 268,722. Patented Dec. 5, 1882.
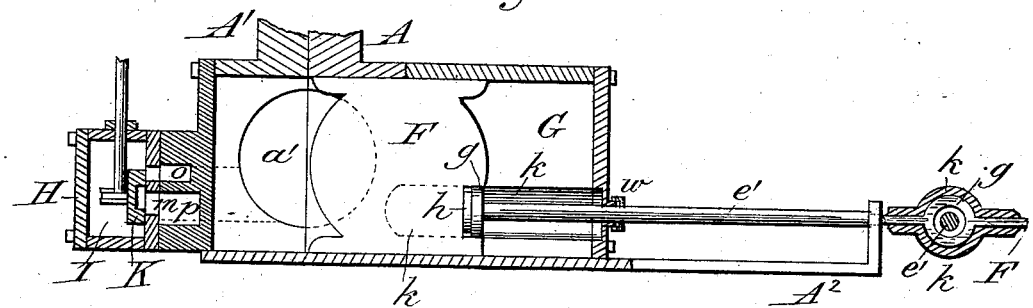
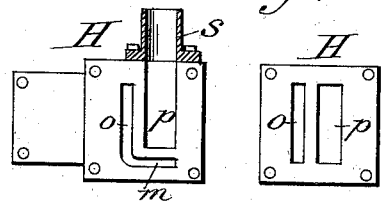
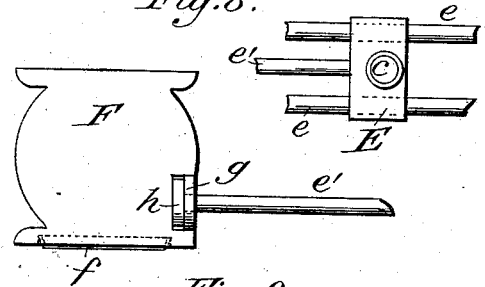
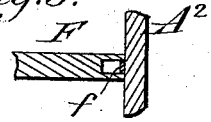
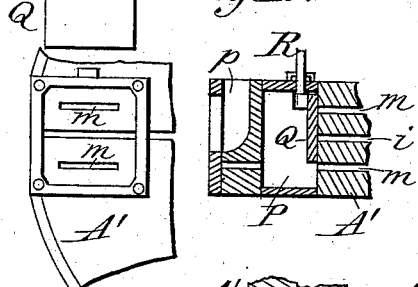
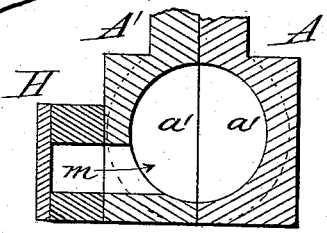
Attest:
H. H. Schott
A. R. Brown
Inventor:
Charles L. Pagenhart
by J. C. Paskeratty

UNITED STATES PATENT OFFICE.

CHARLES L. PAGENHART, OF BOYCEVILLE, VIRGINIA, ASSIGNOR OF ONE-HALF TO DAVID E. CLARKE, OF CHAMBERSBURG, PENNSYLVANIA.

ROTARY ENGINE.

SPECIFICATION forming part of Letters Patent No. 268,722, dated December 5, 1882.

Application filed March 30, 1882. (No model.)

*To all whom it may concern:*

Be it known that I, CHARLES L. PAGENHART, a citizen of the United States, residing at Boyceville, in the county of Clarke and State of Virginia, have invented certain new and useful Improvements in Rotary Steam-Engines; and I do hereby the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to improve and simplify the construction of rotary engines so as to effect an economy in the quantity of steam required, and at the same time impart a steady and uniform motion to the piston; and the invention consists in certain novel features of construction, as will be hereinafter more fully described and claimed.

Figure 1:
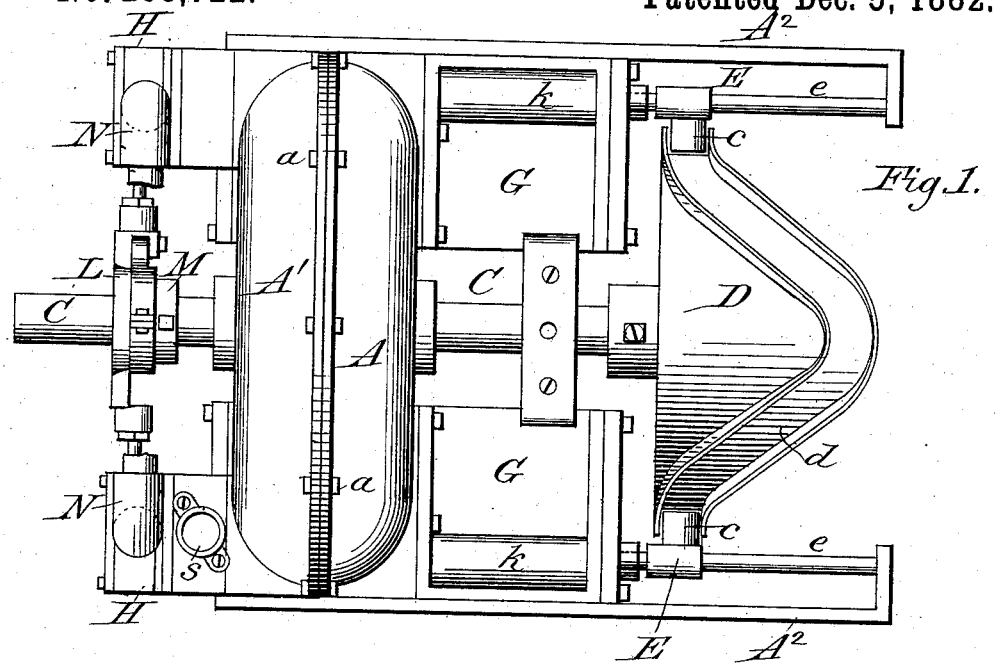
Figure 2:
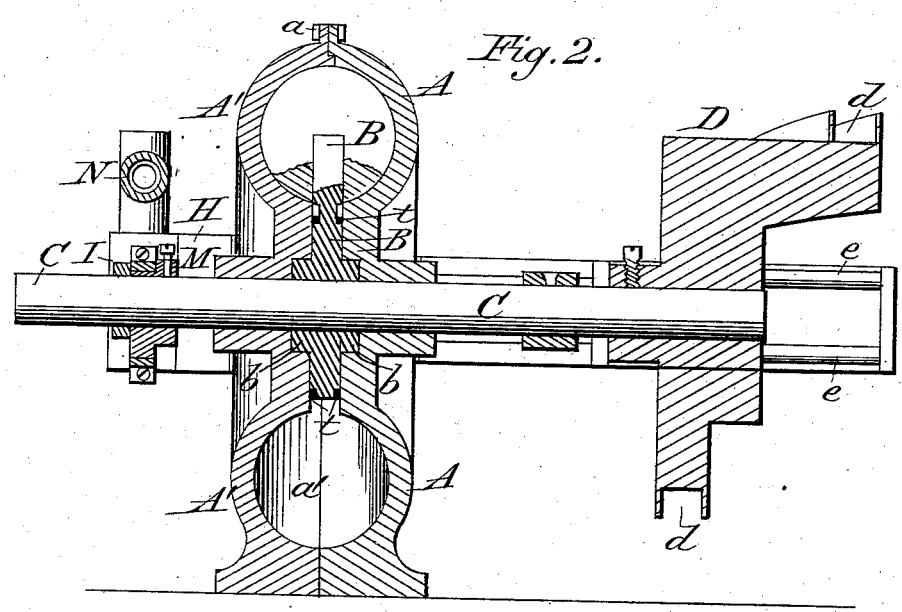
Figure 3:
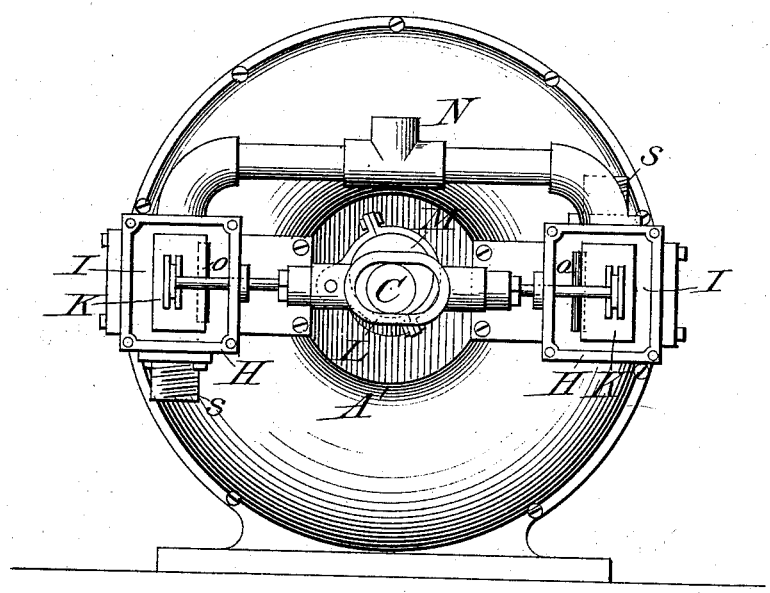
Figure 4:
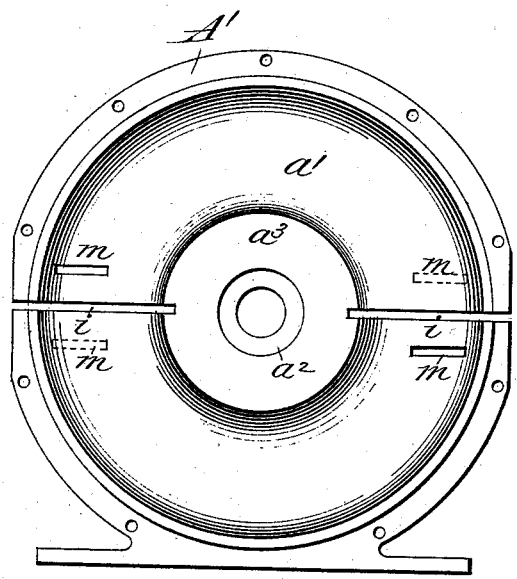
Figure 5:
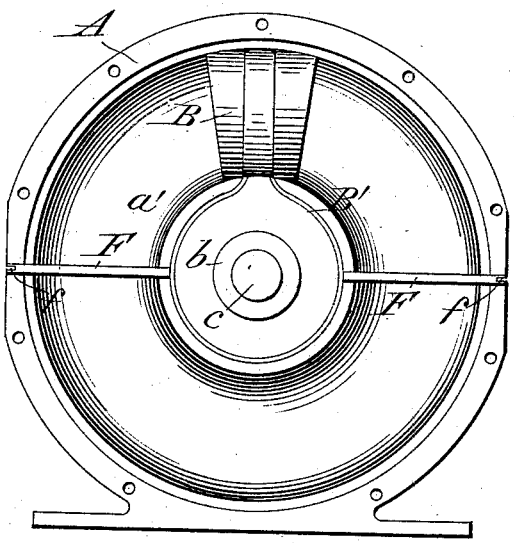

In the annexed drawings, which illustrate the invention, Figure 1 is a plan or top view of my improved rotary engine. Fig. 2 is a central longitudinal section. Fig. 3 is an end view. Fig. 4 is an inner view of one half or side of the cylinder, showing the steam-ports, and also the seats for the ends of the sliding cylinder-heads. Fig. 5 is an inner view of the other half or side of the cylinder, showing a side view of the rotary piston and end views of the sliding cylinder-heads. Fig. 6 is a horizontal longitudinal section of one side of the engine. Fig. 7 represents detail views of the steam-ports. Fig. 8 illustrates the construction of the sliding cylinder-heads and their connections. Fig. 9 is a detail showing the manner of packing the edges of the sliding cylinder-heads, and Fig. 10 illustrates a form of mechanism employed for reversing the motion of the piston.

Like letters are used to designate the same parts in the several views.

The cylinder is composed of two halves, which are flanged and rabbeted, as shown in Fig. 2, so that when united and secured by the bolts $a$ tight joints will be formed. These half-cylinders or parts A A' are accurately fitted together, and are provided internally with a rounded annular space, $a'$, in which works the rotary piston B, which is keyed to a shaft, C, that passes through the cylinder. The faces of the rotary piston B are of a circular form corresponding with the circular cross-section of the space or chamber $a'$, as shown in Fig. 2, and said faces are inclined toward each other from without inward, as shown in Fig. 5, for the purpose hereinafter explained. The piston B has a hub or ring, B', preferably provided with collars $b\ b$, by means of which it is attached to the shaft C, and these collars revolve within circular recesses $a^2$, that are formed in the central inwardly-projecting portions or hubs, $a^3$, of the cylinder-halves A A', respectively. This construction, as illustrated in Figs. 2, 4, and 5, affords a firm bearing for the rotary piston and secures the advantages of a close steam-tight chamber within which said piston is operated.

To the shaft C, exterior to the cylinder, is attached a cam, D, having an eccentric groove, $d$, which engages on each side of the engine with a roller, $c$, journaled to a cross-head, E, which is adapted to slide horizontally on the guide-rods $e\ e$, that are supported in a suitable frame, $A^2$, attached to or connected with the semi-cylinder A. The cross-head E carries a stem, $e'$, to which is loosely attached a horizontally-sliding cylinder-head, F, which is arranged in a shallow chamber, G, that communicates with the interior of the cylinder by means of a horizontal slit or opening in the semi-cylinder A. These sliding heads or division-plates, F, are arranged one on each side, and are adapted to pass alternately into the annular space or chamber $a'$ within the cylinder, where they form alternately a foothold for the expansion of steam against the rotary piston. The form of the sliding heads or plates F is shown in Fig. 8. These plates have a semicircular or curved outline at each end corresponding with the walls of the annular space or chamber $a'$ within which they fit, the parallel sides or edges of the plates being elongated and grooved for the reception of a suitable packing, $f$, which preferably consists of a strip of spring metal, and is arranged as shown in Figs. 8 and 9. By employing a strip of metal or other spring-packing for this purpose the plate, when projected into the cylinder, is held firmly against the hub of the piston. The plate F is slotted at one corner and provided with a circular flange or shoulder, $g$, for engagement with a collar, $h$, at the end of the stem $e'$, said collar fitting loosely within the slot adjoining the perforated shoulder $g$, through which the stem $e'$ passes. By this means the sliding plate has a loose connection with its stem, and is thereby enabled to adjust itself more readily in entering its seat $i$ in the semi-cylinder $A'$, even if the parts should not be perfectly and accurately fitted. The shallow chambers G G, in which the sliding plates or cylinder-heads F F are placed, are each provided with a swell, $k$, within which the shoulder $g$ and collar $h$ are enabled to pass, the space within the remaining portion of each chamber being only sufficient to accommodate its respective plate F and allow it to operate freely without undue friction.

On the outer side of the semi-cylinder $A'$ are formed or attached the steam-chests H H, which communicate with the interior of the cylinder through the ports $m\ m$, the port on one side opening into the cylinder above the seat of the sliding cylinder head or plate F, and on the other side at a point below the corresponding plate. The relative arrangement of these steam-chests is shown in Fig. 3, in which the outer caps or coverings are removed to show the valves governing the respective ports. A horizontal section of the same is shown in Fig. 6; and Fig. 7 is a vertical elevation, in which the steam-chest is laid open to illustrate more clearly the arrangement of the inlet and exhaust openings. These steam-chests may each be constructed in any suitable manner—either in one piece, in which event they will be cored or chambered to form the necessary passages, or they may be formed in several pieces suitably connected. Within each steam-chest H and communicating with the horizontal port or opening $m$ is a vertical chamber or recess, $o$, adjoining which is a larger vertical chamber or recess, $p$, that communicates with the exhaust $s$, that may be arranged either above the steam-chest H, as shown on one side of Fig. 3, or below the chest, as shown on the other side of said figure. Preferably, however, the exhausts on both sides are placed below the steam-chests, and then carried downward in contact with the lower portion of the cylinder and united in a common exit.

In the outer end of each steam-chest H is a valve-chamber, I, in which is arranged a recessed valve, K, adapted to govern the openings or ports in the rear ends of the chambers or recesses $o\ p$, the valves being so arranged as to admit steam to the cylinder and exhaust the same alternately on opposite sides. The stems of these valves are connected by a link or yoke, L, which is passed around the shaft C and connected with an eccentric, M, attached thereto, so that as the shaft C is revolved by the rotary piston B a reciprocating motion will be imparted to the yoke by means of its connection with said eccentric, thus simultaneously sliding the valves K K from side to side, and thereby controlling the entrance and exit of steam to and from the cylinder. The steam-chests are supplied with steam through the bifurcated pipe N, which communicates preferably with the upper portions of the valve-chambers I, but may be arranged in any other convenient manner according to circumstances.

It will be observed that when steam is admitted to the cylinder through the port $m$ on one side the sliding cylinder-head F on that side will be projected across the annular space or chamber $a'$ in position to form a foothold for the steam in its expansion against the adjacent face of the rotary piston B, thus driving the same forward. The motion thus imparted to the piston is transmitted to the shaft C, which actuates the cam D, by means of which the sliding cylinder-heads F are moved in and out. The motion of the shaft C is also communicated by means of the eccentric M to the yoke L, which simultaneously actuates the valves K K, causing them to move from side to side, so as to open and close the ports, and thereby alternately admit steam to the cylinder and exhaust the same. As the piston B continues its rotation the cylinder heads or plates F are thus alternately moved in and out at proper intervals and with such regularity and precision of movement as will insure practically a uniform space for the expansion of steam, thus causing the piston to rotate steadily.

It will also be seen that the piston is always acted upon by a uniform pressure, the sliding valves K K being so arranged as to admit at all times a quantity of steam equal to the capacity of one full port, because when one port is entirely closed the other will be entirely open, and when one is partially closed the other will be open to an extent sufficient to make the quantity of steam admitted by both equal to that admitted by one full port. The steam admitted to the valve-chamber I of the steam-chest H is passed through the ports $o\ m$ to the interior of the cylinder, and the exhaust is passed back through the ports $m\ o$ and recessed portion of the valve K to the port or chamber $p$, and thence to the exhaust-exit $s$, either above or below the steam-chest.

It will be seen that the horizontal position of the inner ports $m$, acting in connection with the inclined faces of the piston, enables the piston in passing said ports to be subjected instantly to the pressure of steam admitted through the same, the entire area of the port being uncovered at once.

The piston is provided with a suitable packing, $t$, that prevents the passage of steam inward to the shaft upon which the piston is secured, the edges of the sliding plate F being also provided with a packing, $f$; and a cap or washer, $w$, is passed around the stems $e'$ of said plates, so that escape of steam from the cylinder and its connections is effectually prevented, except when directed through the exhaust-openings.

In order to provide a means of reversing the engine, I may arrange the ports $m$ so that there will be two on each side, as shown in full and dotted lines in Fig. 4, and also form an intermediate chamber, P, in the semi-cylinder A', between said ports and the exhaust and inlet chambers or openings. Within the chamber P, in contact with the ports m, as shown in Fig. 10, is a valve, Q, having a rod, R, which is connected with an ordinary reversing-bar, so that the engineer, by operating said valve Q, can control the passage of steam through the upper and lower ports, m, on either side, and thereby alter the direction in which the pressure of the steam is exerted against the rotary piston.

When communicating power from the engine to other points the shaft C may be provided with suitable pulleys or wheels arranged in any convenient manner.

It is also obvious that the engine may be employed to advantage for the purpose of propelling locomotives and steamships by making the necessary connections between the shaft C and the driving-wheels of a locomotive or the paddle-wheels or screw of a vessel.

An engine of this construction, while occupying but a small space, is simple and efficient in operation. The force of the steam admitted to the cylinder is exerted upon the piston immediately and uniformly, the pressure being the same at all points. It is therefore obvious that the engine may be started at full speed, if desired, while the rotation of the piston will continue with a uniform motion as long as steam is supplied to the cylinder.

It will also be observed that the quantity of steam required is much less than ordinary, owing to the arrangement of the ports and the employment in connection therewith of the sliding plates or cylinder-heads.

Having thus described my invention, what I claim as new, and desire to secure by Letters Patent, is—

1. In a rotary engine, the combination of a cylinder composed of the parts A A', said cylinder having the horizontally-elongated ports m m and slotted seats i i, the shallow chambers G G, arranged parallel with each other at one side of the cylinder and communicating therewith, the shaft C, the piston B, and grooved cam D, mounted on said shaft, the frame $A^2$, having guide-rods e e arranged on each side of the engine, cross-heads E E adapted to slide on said guides, and having rollers c arranged to engage with the grooved cam, the stems or rods e' e', attached to the cross-heads, and the sliding plates F F, having a loose connection with said stems, all substantially as shown and described.

2. In a rotary engine, the combination of the cylinder A A', having horizontally-elongated ports m m and slotted seats i i, the shaft C, carrying eccentric M, piston B, and grooved cam D, the parallel sliding plates F F, arranged horizontally in shallow chambers G G, communicating with the cylinder, the cross-heads E E, connected to said plates by means of rods e' e', and adapted to be actuated by the cam, so as to project the plates alternately across the interior of the cylinder, the steam-chests H H, having inlet and exhaust passages connected with the ports m m, the valves K K, and the link L, connecting the valve-rods to the eccentric, all substantially as and for the purpose described.

In testimony whereof I affix my signature in presence of two witnesses.

CHARLES LEON PAGENHART.

Witnesses:
PHILIP MAURO,
A. R. BROWN.